United States Patent
Takano

(10) Patent No.: US 8,724,149 B2
(45) Date of Patent: May 13, 2014

(54) IMAGE FORMING APPARATUS AND IMAGE FORMING METHOD TRANSFERRING DATA CORRESPONDING TO LINE OF DOCUMENT WITH SET TIME PERIOD

(75) Inventor: Satoshi Takano, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 81 days.

(21) Appl. No.: 13/356,089

(22) Filed: Jan. 23, 2012

(65) Prior Publication Data

US 2012/0194838 A1 Aug. 2, 2012

(30) Foreign Application Priority Data

Feb. 2, 2011 (JP) ................................ 2011-020890

(51) Int. Cl.
*G06F 3/12* (2006.01)
(52) U.S. Cl.
USPC .......................................... 358/1.15; 358/1.1
(58) Field of Classification Search
None
See application file for complete search history.

(56) References Cited

U.S. PATENT DOCUMENTS

| | | | | |
|---|---|---|---|---|
| 5,392,135 A | * | 2/1995 | Amemiya | ...................... 358/444 |
| 2003/0011821 A1 | * | 1/2003 | Obata et al. | .................. 358/1.16 |
| 2010/0067042 A1 | * | 3/2010 | Ikeda et al. | .................. 358/1.15 |

FOREIGN PATENT DOCUMENTS

JP 4311551 A 8/2009

OTHER PUBLICATIONS

English language abstract for publication No. JP-2005-236577 which corresponds to JP-4311551-B2.

* cited by examiner

*Primary Examiner* — Benny Q Tieu
*Assistant Examiner* — Martin Mushambo
(74) *Attorney, Agent, or Firm* — Harness, Dickey & Pierce, P.L.C.

(57) ABSTRACT

An image forming apparatus includes an image reading unit that reads image data corresponding to one line of an original document with a line period, a first transfer unit that transfers the image data, the image data being read by the image reading unit and being input to the first transfer unit, a transfer control unit that controls the first transfer unit to transfer the image data, and an image forming unit that forms an image on a medium on the basis of the image data transferred by the first transfer unit. The transfer control unit controls the first transfer unit to transfer the image data corresponding to one line of the original document every time when a predetermined time period passes which is shorter than a time length of the line period.

5 Claims, 6 Drawing Sheets

IMAGE FORMING APPARATUS AND IMAGE FORMING METHOD TRANSFERRING DATA CORRESPONDING TO LINE OF DOCUMENT WITH SET TIME PERIOD

CROSS-REFERENCE TO RELATED APPLICATIONS

The present application claims priority to and incorporates by reference the entire contents of Japanese Patent Application No. 2011-020890 filed in Japan on Feb. 2, 2011.

BACKGROUND OF THE INVENTION

1. Field of the Invention

The invention relates to an image forming apparatus and an image forming method.

2. Description of the Related Art

Conventionally, there is known a technology for simultaneously reading an image of a front surface and an image of a back surface of a document and sequentially transferring the read image data to main memory. For example, Japanese Patent Application Laid-open No. 2005-236577 discloses an image forming apparatus having a first image data reading unit for reading an image of a front surface of a document, a second image data reading unit for reading an image of a back surface and capable of variably setting each of the transfer speed of first image data (image data of the front surface of the document) read by the first image data reading unit and the transfer speed of second image data (image data of the back surface of the document) read by the second image data reading unit.

Here, in Japanese Patent Application Laid-open No. 2005-236577, in order to reduce a time length until the transfer of the image data is completed, there is assumed a case that the first image data read by the first image data reading unit is transferred line by line with a line period (every time when a time length required to read the image data corresponding to one line of the document has passed), whereas the second image data read by the second image data reading unit is transferred line by line continuously and asynchronously to the line period. Incidentally, the transfer destination of each of the first image data and the second image data is main memory connected to a controller via a bus. In this case, the second image data is continuously transferred line by line. Therefore, when the second image data is transferred, the bus (data transfer path) between the controller and the main memory is continuously occupied until the transfer of the second image data has been completed. Accordingly, the second image data transferred to the main memory cannot be transferred to other device (auxiliary memory and the like) connected to the controller. That is, a secondary transfer cannot be executed.

SUMMARY OF THE INVENTION

It is an object of the present invention to at least partially solve the problems in the conventional technology.

An image forming apparatus is provided with an image reading unit that reads image data corresponding to one line of an original document with a line period; a first transfer unit that transfers the image data, the image data being read by the image reading unit and being input to the first transfer unit; a transfer control unit that controls the first transfer unit to transfer the image data; and an image forming unit that forms an image on a medium on the basis of the image data transferred by the first transfer unit. The transfer control unit controls the first transfer unit to transfer the image data corresponding to one line of the original document every time when a predetermined time period passes, the predetermined time period being shorter than a time length of the line period.

An image forming method includes reading image data corresponding to one line of an original document with a line period; transferring line by line the image data read at the reading, so that the image data corresponding to one line of the original document is transferred every time when a predetermined time period passes, the predetermined time period being shorter than a time length of the line period; and forming an image on a medium on the basis of the image data transferred at the transferring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
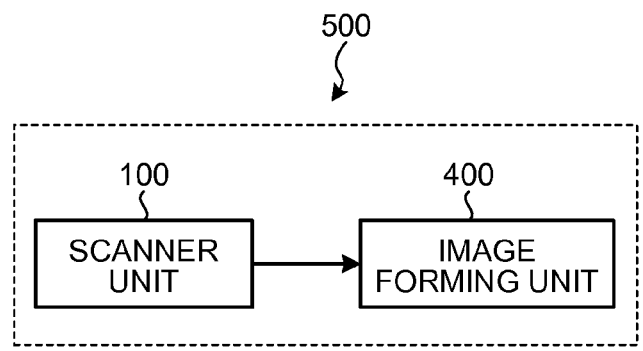
FIG. 1 is a block diagram showing an example of a schematic configuration of an image forming apparatus according to an embodiment.

An embodiment of an image forming apparatus and an image forming method according to the invention will be explained below in detail referring to the accompanying drawings. FIG. 1 is a block diagram showing an example of a schematic configuration of an image forming apparatus 500 according to the embodiment. As shown in FIG. 1, the image forming apparatus 500 includes a scanner unit 100 and an image forming unit 400. The scanner unit 100 reads the image data of an original document as a reading target. The image data read by the scanner unit 100 is delivered to the image forming unit 400. The image forming unit 400 forms an image on a medium, for example, paper and the like on the basis of the image data read by the scanner unit 100.

Figure 2:
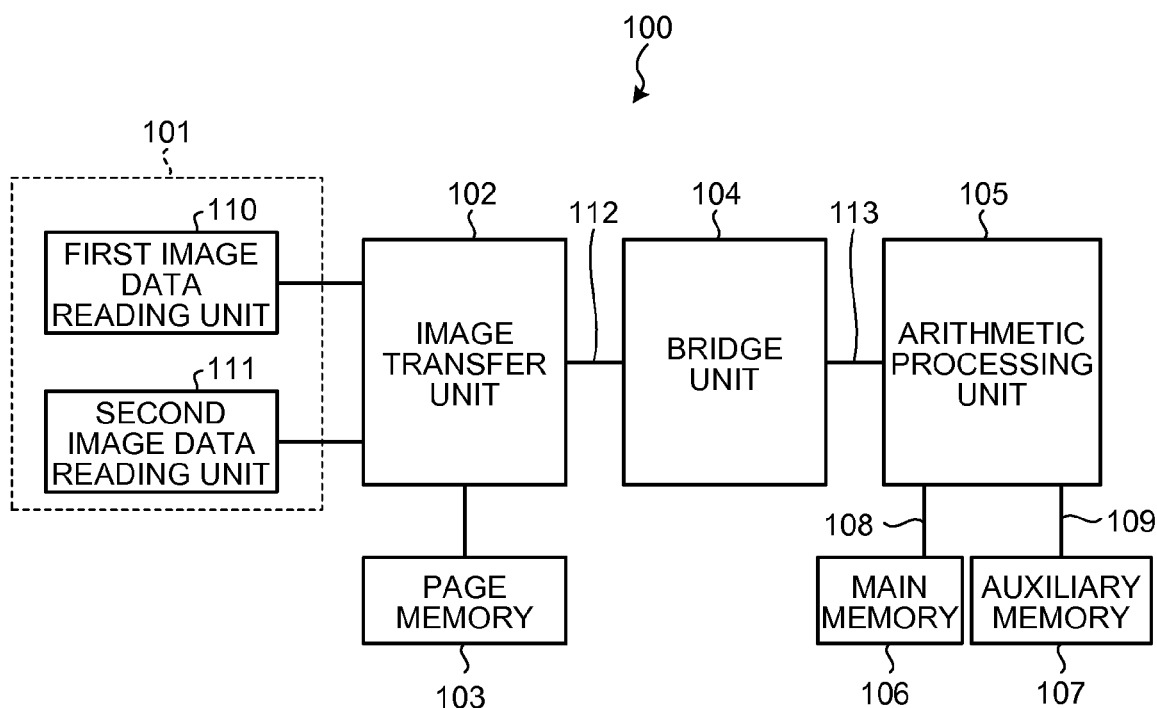
FIG. 2 is a block diagram showing an example of a schematic configuration of a scanner unit.

FIG. 2 is a block diagram showing an example of a schematic configuration of the scanner unit 100. As shown in FIG. 2, the scanner unit 100 includes an image reading unit 101, an image transfer unit 102, page memory 103, a bridge unit 104, an arithmetic processing unit 105, main memory 106, and auxiliary memory 107.

The image reading unit 101 is a unit to read an image of an original document. As shown in FIG. 2, the image reading unit 101 includes a first image data reading unit 110 and a second image data reading unit 111. The first image data reading unit 110 is a unit to read an image (first image) of a front surface of an original document. The second image data reading unit 111 is a unit to read an image (second image) of a back surface of the original document. Hereinafter, the data read by the first image data reading unit 110 is called as "the first image data" and the data read by the second image data reading unit 111 is called as "the second image data". Alternatively, when the first image data and the second image data are not necessarily to be differentiated from each other, they are simply called as "the image data".

Each of the first image data reading unit 110 and the second image data reading unit 111 executes a read operation for reading image data corresponding to one line with a line period. The "line period" means a time length necessary for each of the first image data reading unit 110 and the second image data reading unit 111 to read the image data corresponding to one line. Note that, in the present embodiment, the read operation by the first image data reading unit 110 and the read operation by the second image data reading unit 111 are executed at the same time. Each of the first image data read by the first image data reading unit 110 and the second image data read by the second image data reading unit 111 is supplied line by line to the image transfer unit 102 the subsequent stage.

The image transfer unit 102 is a unit to transfer each of the first image data read by the first image data reading unit 110 and the second image data read by the second image data reading unit 111 to the bridge unit 104 the subsequent stage. The image transfer unit 102 is composed of a semiconductor integrated circuit. In the present embodiment, when the image transfer unit 102 transfers the first image data read by the first image data reading unit 110, the image transfer unit 102 transfers the first image data to the bridge unit 104 in synchronization with the line period. Whereas, when the image transfer unit 102 transfers the second image data read by the second image data reading unit 111, the image transfer unit 102 transfers the second image data to the bridge unit 104 asynchronously to the line period. More specifically, this operation is as described below.

Figure 3:
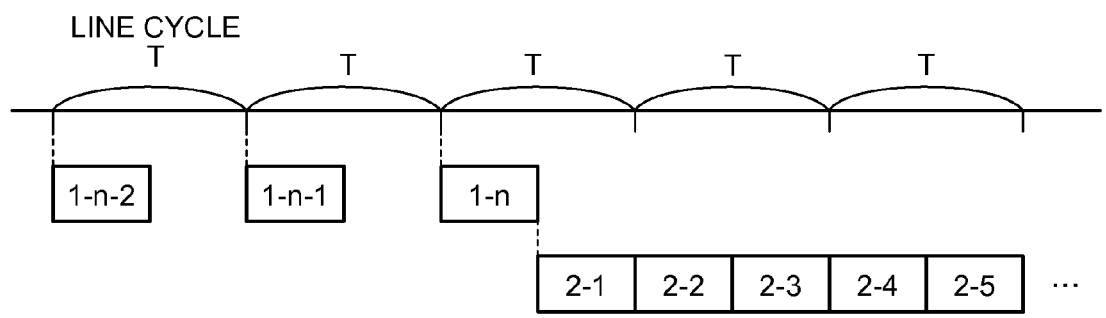
FIG. 3 is a view showing a timing when an image transfer unit transfers first image data and second image data.

In the present embodiment, the first image data read by the first image data reading unit 110 and the second image data read by the second image data reading unit 111 is input line by line respectively to the image transfer unit 102 simultaneously. The image transfer unit 102 transfers the input first image data corresponding to one line to the bridge unit 104 with a line period, while the image transfer unit 102 writes the input second image data corresponding to one line to the page memory 103. The page memory 103 can store image data corresponding to at least one page. When the transfer of the first image data is finished, the image transfer unit 102 sequentially reads the second image data stored in the page memory 103 line by line and continuously (asynchronously to the line period) transfers the second image data to the bridge unit 104. FIG. 3 is a view showing a timing when the image transfer unit 102 transfers the first image data and the second image data respectively to the bridge unit 104.

The reference symbol "T" in FIG. 3 shows the time length of the line period. Further, in the present embodiment, the number of lines of each of the first image data and the second image data is "n", and, in FIG. 3, "1-$x$ (1≤$x$≤n)" shows the data of an x-th line of the first image data, and "2-$y$ (0≤$y$≤n)" shows the data of a y-th line of the second image data. For example, "1-$n$" of FIG. 3 shows the data of an n-th line of the first image data, and "2-1" of FIG. 3 shows the data of a first line of the second image.

The explanation will be continued referring back to FIG. 2. The bridge unit 104 is a unit to control the timing at which the image data transferred from the image transfer unit 102 is transferred to the arithmetic processing unit 105, the subsequent stage as well as a unit to execute the image processing of the image data transferred from the image transfer unit 102. The bridge unit 104 is composed of a semiconductor integrated circuit. Detailed contents of the bridge unit 104 will be described later.

The arithmetic processing unit 105 writes the image data transferred from the bridge unit 104 to the main memory 106 and/or the auxiliary memory 107. The arithmetic processing unit 105 is connected to the main memory 106 via a bus 108, and the arithmetic processing unit 105 is connected to the auxiliary memory 107 via a bus 109. The arithmetic processing unit 105 is composed of a semiconductor integrated circuit. Each of the main memory 106 and the auxiliary memory 107 stores various types of control programs executed by the arithmetic processing unit 105 and the image data. The arithmetic processing unit 105 controls the scanner unit 100 in its entirety by executing the various types of the control programs read from each of the main memory 106 and the auxiliary memory 107.

As shown in FIG. 2, the image transfer unit 102 is connected to the bridge unit 104 via an interface 112, and the bridge unit 104 is connected to the arithmetic processing unit 105 via an interface 113. Each of the interfaces 112 and 113, which may be composed of a PCI-Express, is an interface for transferring image data between IC chips.

Figure 4:
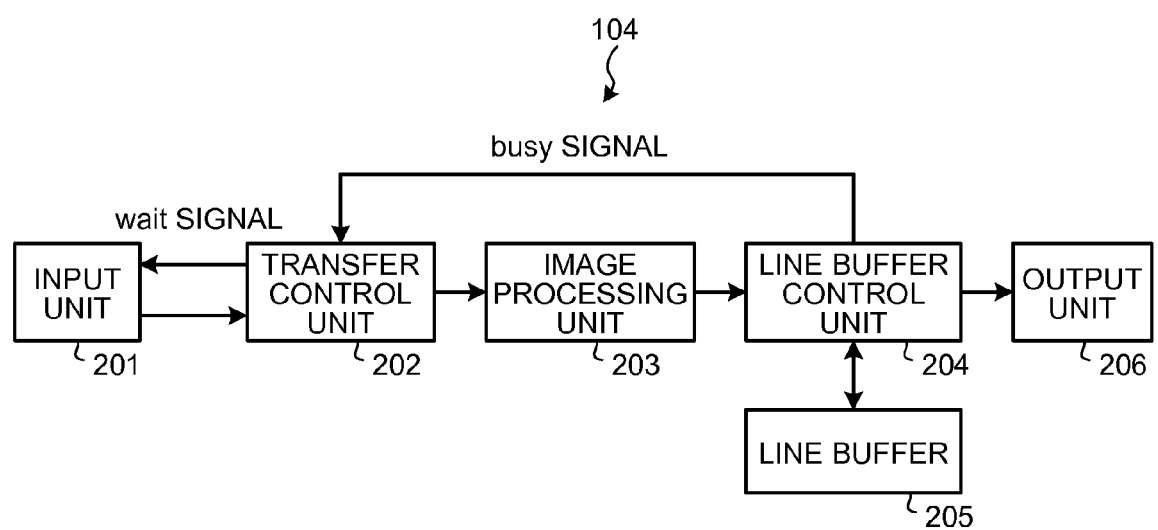
FIG. 4 is a block diagram showing an example of a schematic configuration of a bridge unit.

FIG. 4 is a block diagram showing an example of a detailed configuration of the bridge unit 104 described above. As shown in FIG. 4, the bridge unit 104 includes an input unit 201, a transfer control unit 202, an image processing unit 203, a line buffer control unit 204, a line buffer 205, and an output unit 206. The input unit 201 is input with the image data transferred from the image transfer unit 102 via the interface 112.

The input unit 201 transfers the input image data to the transfer control unit 202 the subsequent stage. When the input unit 201 is supplied with an asserted (valid) wait signal from the transfer control unit 202, the input unit 201 stops the transfer of the image data. On the other hand, when the input unit 201 is supplied with a negated (invalid) wait signal, the input unit 201 transfers the input image data to the transfer control unit 202 line by line. In the present embodiment, the input unit 201 includes a register (not shown) for temporarily holding or storing the image data input from the image transfer unit 102. Then, when the wait signal supplied from the transfer control unit 202 is switched from an asserted state to a negated state, the input unit 201 sequentially reads line by line the image data held in the register and transfers the image data to the transfer control unit 202 the subsequent stage.

The transfer control unit 202 controls the transfer timing of the input unit 201 and also transfers (supplies) the image data transferred from the input unit 201 to the image processing unit 203 the subsequent stage. Detailed contents of the transfer control unit 202 will be described later.

The image processing unit 203 executes an image processing, such as a variable power processing, a dither processing and the like, to the image data supplied from the transfer control unit 202. The image processing unit 203 supplies the image data after subjected to the image processing to the line buffer control unit 204 of the subsequent stage.

The line buffer control unit 204 sequentially writes line by line the image data supplied from the image processing unit 203 to the line buffer 205. Further, the line buffer control unit 204 sequentially reads line by line the image data stored in the line buffer 205, and transfers the image data to the output unit 206 of the subsequent stage. Further the line buffer control unit 204 supplies a busy signal to the transfer control unit 202.

When the line buffer control unit 204 transfers the image data to the output unit 206, the line buffer control unit 204 asserts the busy signal. Further, every time when the transfer of the image data corresponding to one line is completed, the line buffer control unit 204 negates the busy signal. The line buffer 205 is configured to be able to store the image data corresponding to at least two lines. The output unit 206 outputs the image data transferred from the line buffer control unit 204 to the arithmetic processing unit 105 via the interface 113.

Figure 5:
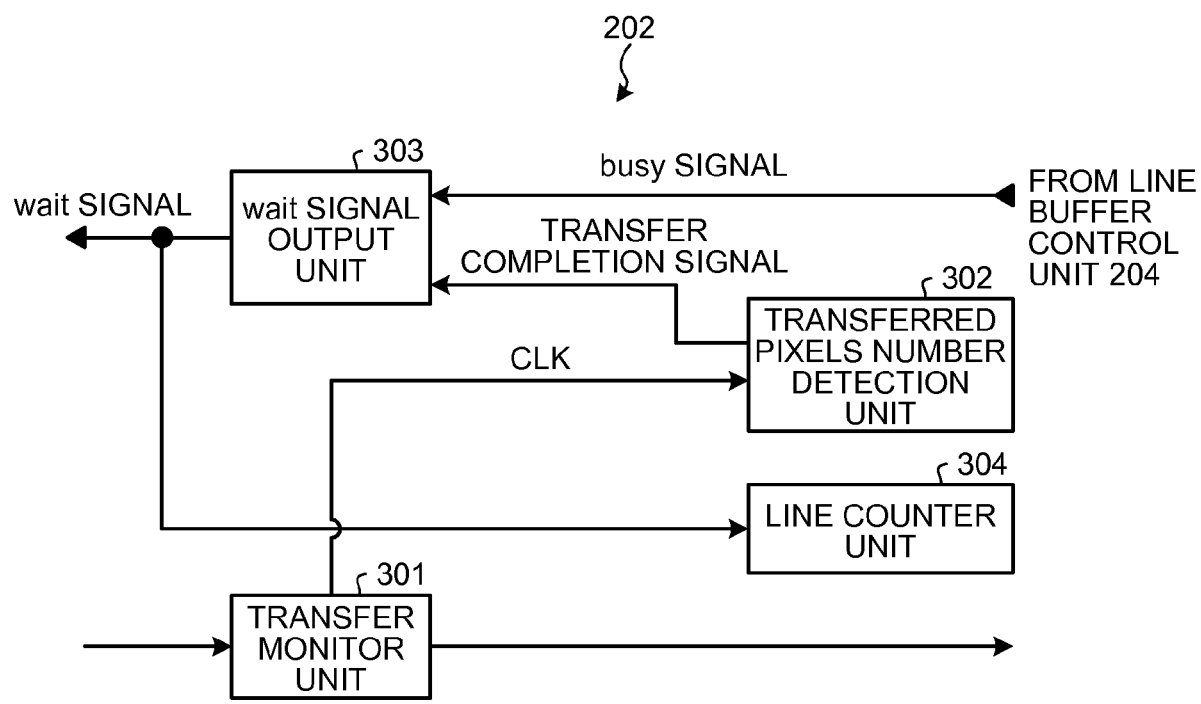
FIG. 5 is a block diagram showing an example of a schematic configuration of a transfer control unit.

FIG. 5 is a block diagram showing an example of a detailed configuration of the transfer control unit 202. As shown in FIG. 5, the transfer control unit 202 includes a transfer monitor unit 301, a transferred pixel number detection unit 302, a wait signal output unit 303, and a line counter unit 304. The transfer monitor unit 301 monitors the transfer state of the input unit 201 of a precedence stage. More specifically, the transfer monitor unit 301 determines whether or not the input unit 201 executes a transfer depending on whether or not the transfer monitor unit 301 receives the image data from the input unit 201. Further, the transfer monitor unit 301 transfers the image data received from the input unit 201 to the image processing unit 203 of the subsequent stage. When the transfer monitor unit 301 receives the image data from the input unit 201, that is, when the transfer monitor unit 301 determines that the input unit 201 executes the transfer, the transfer monitor unit 301 supplies a clock CLK to the transferred pixel number detection unit 302. In contrast, when the transfer monitor unit 301 does not receive the image data from the input unit 201, that is, when the transfer monitor unit 301 determines that the input unit 201 does not execute the transfer, the transfer monitor unit 301 stops supplying the clock CLK to the transferred pixel number detection unit 302.

The transferred pixel number detection unit 302 counts the clock CLK supplied from the transfer monitor unit 301 and detects whether or not the number of pixels transferred by the input unit 201 has reached the number of pixels corresponding to one line by using the count value. More specifically, every time when the transferred pixel number detection unit 302 counts the clock CLK, the transferred pixel number detection unit 302 executes a down-count from a value corresponding to the number of pixels of the one line previously held in a register (not shown). Then, when the count value has reached 0, the transferred pixel number detection unit 302 detects that the number of pixels transferred by the input unit 201 has reached the number of pixels of the one line.

In the present embodiment, in a stage before starting the transfer of the image data, the transferred pixel number detection unit 302 is notified of a bit width of 1 pixel of the image data to be transferred. Then, the transferred pixel number detection unit 302 variably sets a down-count value in response to the notified bit width. For example, when the bit width of 1 pixel is 8 bits, the transferred pixel number detection unit 302 can set the down-count value to "−1", when the bit width of 1 pixel is 4 bits, the transferred pixel number detection unit 302 can set the down-count value to "−2", when the bit width of 1 pixel is 2 bits, the transferred pixel number detection unit 302 can set the down-count value to "−4", and when the bit width of 1 pixel is 1 bit, the transferred pixel number detection unit 302 can set the down-count value to "−8". Incidentally, when the transferred number of pixels is an odd number and the bit width of 1 pixel is 4 bits or less, a broken number is generated. However, even in a case that the count value becomes 0 or less, the count value is set to "0". When the transferred pixel number detection unit 302 detects that the number of pixels transferred by the input unit 201 has reached the number of pixels corresponding to one line, the transferred pixel number detection unit 302 outputs a transfer completion signal to the wait signal output unit 303.

When a predetermined condition has established, the wait signal output unit 303 asserts the wait signal to be output to the input unit 201. More specifically, when the wait signal output unit 303 has been supplied with the negated busy signal from the line buffer control unit 204 and when the wait signal output unit 303 has been supplied with the transfer completion signal from the transferred pixel number detection unit 302, the wait signal output unit 303 asserts the wait signal. When a predetermined period has passed after the wait signal is asserted, the wait signal output unit 303 negates the wait signal. The time length of a predetermined period is set to a time length shorter than the time length of the line period. Accordingly, when the input unit 201 transfers the image data to the transfer control unit 202, the input unit 201 cannot transfer the image data of a next line until a predetermined period has passed after the input unit 201 transfers the image data of the one line. In other words, the input unit 201 cannot transfer the image data line by line continuously to the transfer control unit 202.

The line counter unit 304 counts the number of lines transferred by the input unit 201. When a count value has reached a predetermined value, the line counter unit 304 detects a switch of a page. More specifically, this operation is as described below. When the line counter unit 304 detects negation of the wait signal output from the wait signal output unit 303, the line counter unit 304 increments (counts up) the count value only by "1". Then, when the count value has reached a predetermined value, the line counter unit 304 detects the switch of the page, inverts the level of a page signal for identifying a page, and supplies the page signal to the output unit 206. The page signal can be set, for example, the page signal of page 1 is "0", the page signal of page 2 is "1", and the like.

Figure 6:
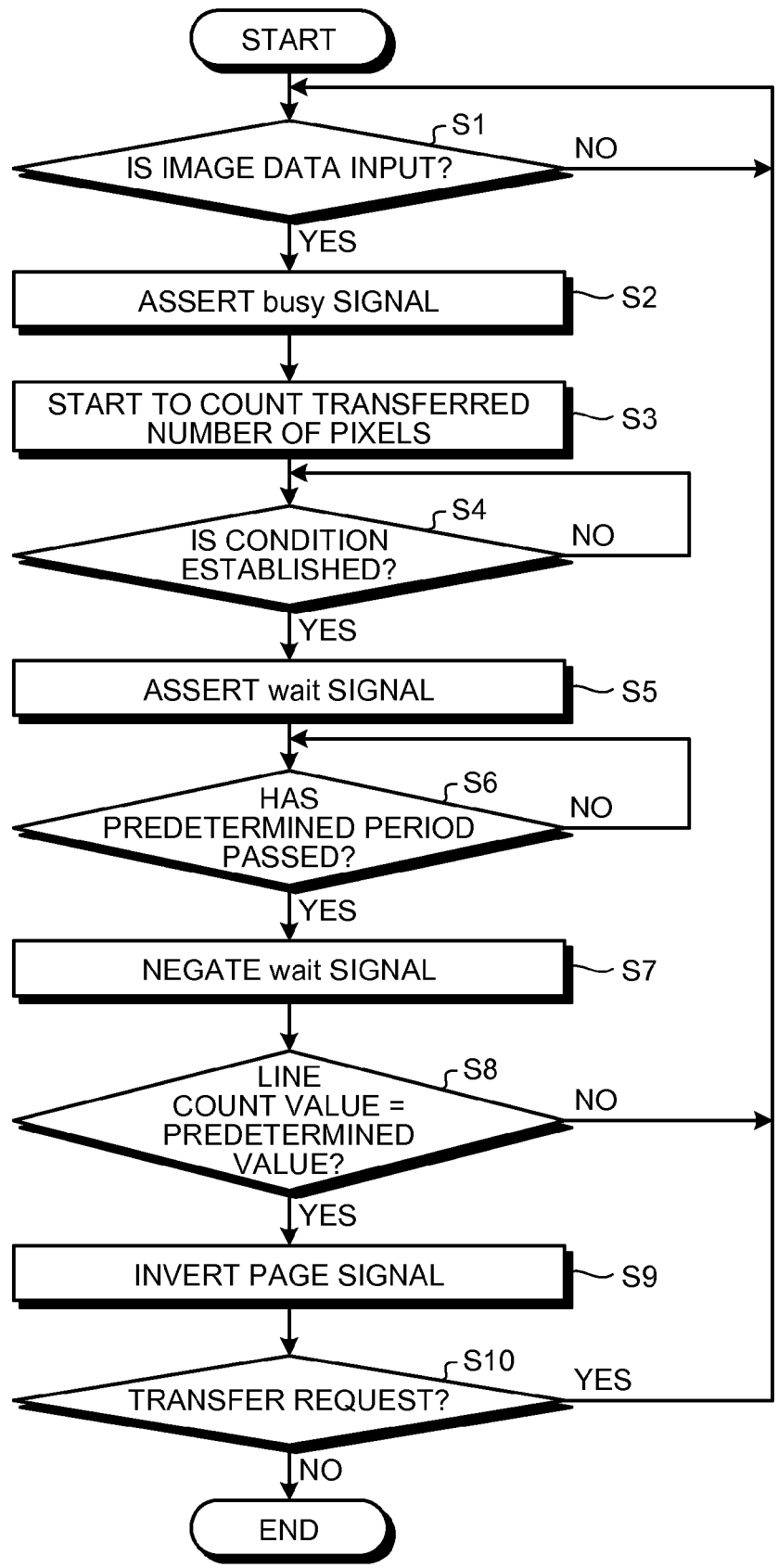
FIG. 6 is a flowchart showing an example of the processing operation of a bridge unit.

FIG. 6 is a flowchart showing an example of the transfer processing operation in the scanner unit 100. First, the input unit 201 determines whether or not the image data from the image transfer unit 102 has been input (step S1). When the result at step S1 is YES, the input unit 201 starts the transfer of the input image data and the line buffer control unit 204 asserts the busy signal (step S2); and the transferred pixel number detection unit 302 starts to count the transferred number of pixels (step S3).

The process goes to step S4. At step S4, the wait signal output unit 303 determines whether or not the predetermined condition has been established. More specifically, the wait signal output unit 303 determines whether the busy signal from the line buffer control unit 204 has been negated and whether the wait signal output unit 303 has received the transfer completion signal from the transferred pixel number detection unit 302.

When the wait signal output unit 303 determines that the predetermined condition has established, the wait signal output unit 303 asserts the wait signal (step S5). Then, the wait signal output unit 303 determines whether or not the predetermined period has passed (step S6), and when the wait signal output unit 303 determines that the predetermined period has passed, the wait signal output unit 303 negates the wait signal (step S7). When the line counter unit 304 detects the negation of the wait signal, the line counter unit 304 counts up the count value only by "1" and determines whether or not the count value has reached the predetermined value (step S8). When the result of step S8 is YES, the line counter unit 304 inverts the level of the page signal and supplies the page signal to the output unit 206 (step S9). Whereas, when the result of step S8 is NO, the process is returned to step S1 described above.

Next, the bridge unit 104 determines whether or not there is a transfer request from the image transfer unit 102 (step S10), and when the bridge unit 104 determines that there is no transfer request, the bridge unit 104 finishes a series of the processes. Whereas, when the bridge unit 104 determines that there is the transfer request, the process is returned to the step S1 described above.

As described above, in the present embodiment, the transfer control unit 202 controls the transfer timing of the input unit 201 so as not to transfer the image data of the next line until the predetermined period, which is shorter than the time length of the line period, has passed after the image data of the one line is transferred. Accordingly, even when the second image data is input line by line continuously to the bridge unit 104 (the input unit 201) from the image transfer unit 102 as in FIG. 3, the input unit 201 cannot transfer the second image data of the next line until the predetermined period has passed after the second image data of the one line is transferred. The transfer timing of the input unit 201 in this case is as shown in FIG. 7.

Figure 7:
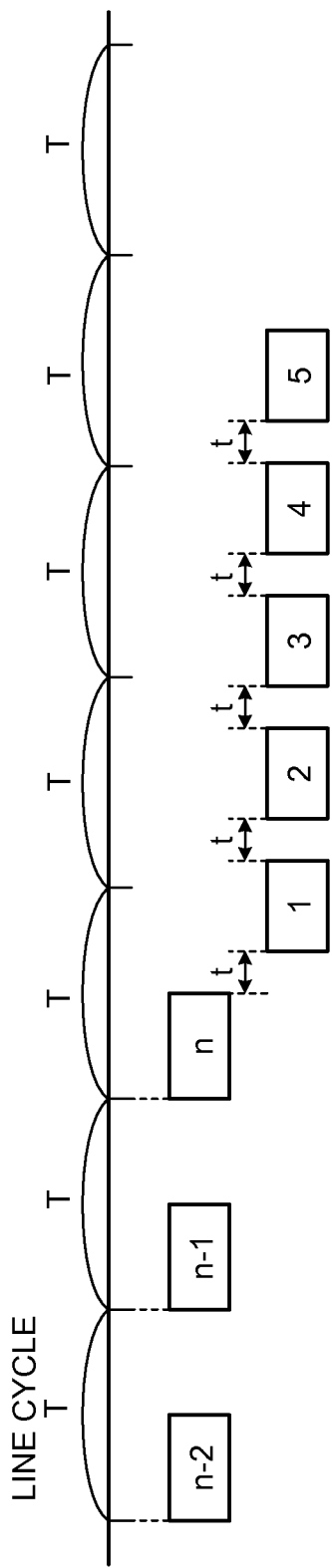
FIG. 7 is a view showing an example of image data output from the bridge unit.

As can be understood also from FIG. 7, the predetermined period "t" is interposed between a period for transferring the second image data of a certain line and a period for transferring the second image data of a next line. Therefore, the bus 108 can be prevented from being continuously occupied when the second image data is transferred. Further, since the predetermined period "t" is shorter than the time length "T" of the line period, the time length until the transfer of the second image data has been completed can be reduced as compared with a case that the input unit 201 transfers the second image data with a line period. That is, according to the present embodiment, there can be achieved an advantageous effect that the time length until the transfer of the image data has been completed can be reduced while preventing the bus from being continuously occupied when the transfer of the image data is executed.

Figure 8:
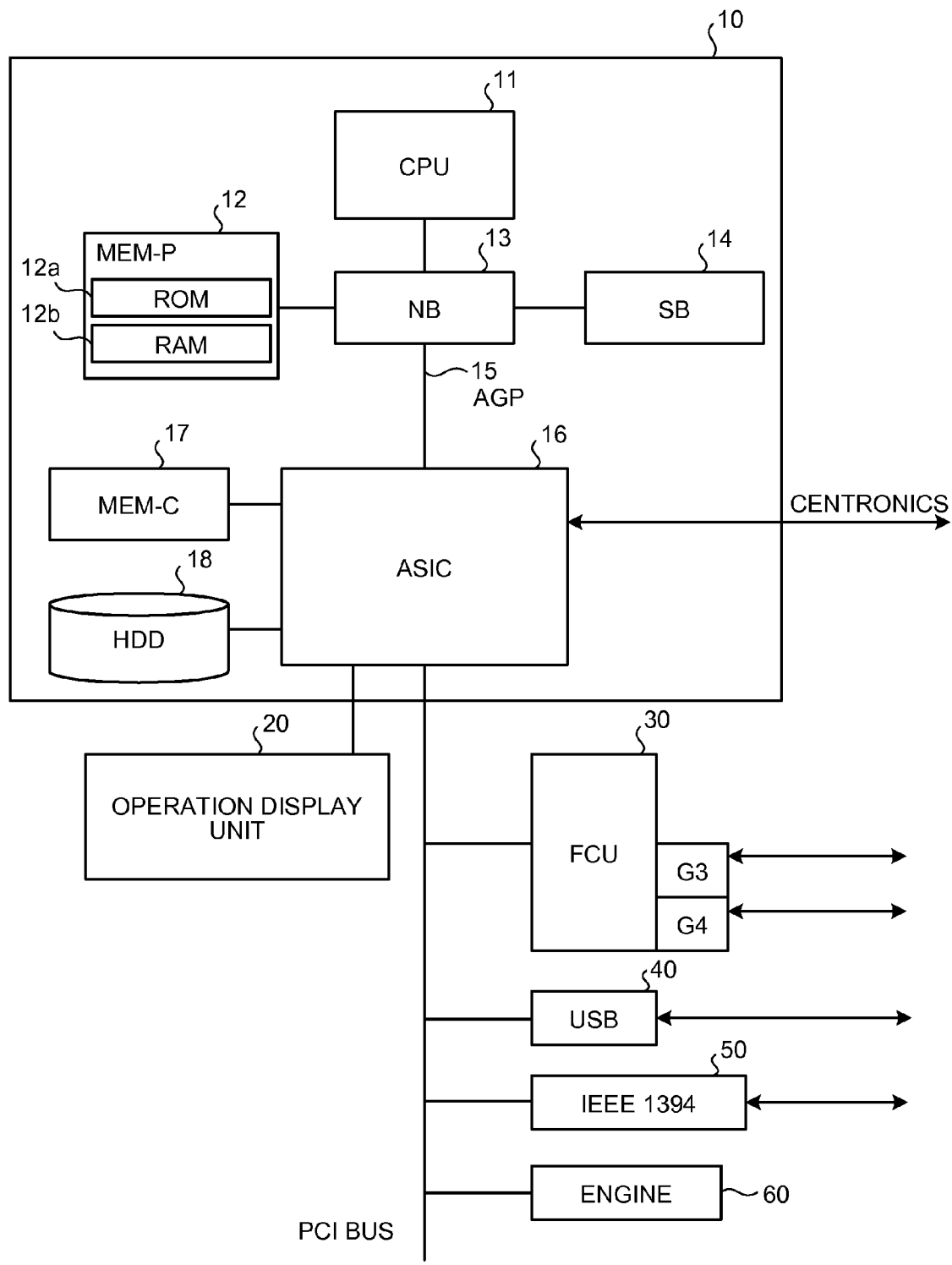
FIG. 8 is a block diagram showing an example of a hardware configuration of the image forming apparatus.

FIG. 8 is a block diagram showing an example of a hardware configuration of the image forming apparatus 500 according to the present embodiment. As shown in the drawing, the image forming apparatus 500 is configured by connecting a controller board 10 to an engine unit (Engine) 60 via a PCI (Peripheral Component Interface) bus. The controller board 10 is a device to control the entire operation of the image forming apparatus 500, as well as an input from an operation unit (not shown), a communication and a drawing. The engine unit 60 is a printer engine and the like capable of being connected to the PCI bus. It may be, for example, a white/black plotter, a 1-drum color plotter, a 4-drum color plotter, a scanner or a fax unit, and the like. Incidentally, the engine unit 60 includes an image processing section such as an error diffusion, a gamma conversion and the like, in addition to the so-called engine section such as the plotter and the like.

The controller board 10 is configured to include a CPU 11, a north bridge (NB) 13, system memory (MEM-P) 12, a south bridge (SB) 14, local memory (MEM-C) 17, an ASIC (Application Specific Integrated Circuit) 16 and a hard disc drive (HDD) 18. The north bridge (NB) 13 and the ASIC 16 are connected via an AGP (Accelerated Graphics Port) bus 15. In addition, the MEM-P 12 further includes ROM (Read Only Memory) 12a and RAM (Random Access Memory) 12b.

The CPU 11, which controls the image forming apparatus 500 in its entirety, includes a chip set composed of the NB 13, the MEM-P 12 and the SB 14. The CPU 11 is connected to other equipment via the chip set.

The NB 13 is a bridge for connecting the CPU 11 with the MEM-P 12, the SB 14 and the AGP 15. The NB 13 includes a memory controller for controlling the read/write with respect to the MEM-P 12. Furthermore, the NB 13 includes a PCI master and an AGP target.

The MEM-P 12 is system memory used as memory for storing a program and data, memory for developing the program and the data, drawing memory of a printer, and the like and is composed of the ROM 12a and the RAM 12b. The ROM 12a is read-only memory used as memory for storing the program and the data, and the RAM 12b is memory which can write and read data and used as memory for developing the program and the data, drawing memory of the printer, and the like.

The SB 14 is a bridge for connecting the NB 13 with a PCI device and a peripheral device. The SB 14 is connected to the NB 13 via a PCI bus. A network interface (I/F) unit and the like are also connected to the PCI bus.

The ASIC 16 is an IC (Integrated Circuit) for the image processing and includes hardware elements for the image processing. The ASIC is served as a bridge to which the AGP 15, the PCI bus, the HDD 18 and the MEM-C 17 are connected, respectively. The ASIC 16 is composed of a PCI target and an AGP master, an arbiter (ARB) acting as the central core of the ASIC 16, a memory controller for controlling the MEM-C 17, plural DMACs (Direct Memory Access Controllers) for executing the rotation and the like of the image data by a hardware logic and the like, and a PCI unit for transferring data between the PCI unit and the engine unit 60 via the PCI bus. The ASIC 16 is connected with a FCU (Facsimile Control Unit) 30, a USB (Universal Serial Bus) 40, and an IEEE 1394 (the Institute of Electrical and Electronics Engineers 1394) interface 50 via the PCI bus. An operation display unit 20 is directly connected to the ASIC 16.

The MEM-C 17 is local memory used as a sign buffer and an image buffer for copy. The HDD (Hard Disk Drive) 18 is a storage for accumulating the image data, programs, font data, and forms. The AGP 15 is a bus interface for a graphics accelerator card proposed to increase the speed of a graphic processing. The AGP 15 increases the speed of the graphics accelerator card by directly accessing the MEM-P 12 at a high throughput.

Modifications of Embodiment

Although the embodiment according to the invention have been explained above, the invention is not limited to the embodiment described above and can be variously modified in a scope which does not depart from the gist of the invention. For example, in the embodiment described above, although the input unit 201 in the bridge unit 104 transfers the input image data to the transfer control unit 202, the invention is not limited thereto, and, for example, the image data transferred by the input unit 201 may be transferred to any optional transfer destination. For example, the input unit 201 can also directly transfer the input image data to the image processing unit 203.

Further, in the embodiment described above, as to the first image data, although the image transfer unit 102 transfers the first image data of the one line to the bridge unit 104 with a line period, whereas the image transfer unit 102 transfers the second image data to the bridge unit 104 line by line continuously and asynchronously to the line period. However, the invention is not limited thereto and the transfer timing of the image transfer unit 102 can be optionally changed. For example, the image transfer unit 102 can transfer the first image data line by line continuously to the bridge unit 104 asynchronously to the line period, whereas the image transfer unit 102 transfer the second image data of the one line to the bridge unit 104 with a line period.

According to the invention, the transfer control unit controls the first transfer unit so as to transfer image data corresponding to one line every time when a predetermined period has passed, which is shorter than the time length of the line period. Therefore, the invention achieves an advantageous effect that the time length until the transfer of the image data has been completed can be reduced while preventing the bus from being continuously occupied when the transfer of the image data is executed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image reading unit that reads image data corresponding to one line of an original document with a line period, the image reading unit including,
      a first image data reading unit that reads first image data which is image data of a first surface of the original document, and
      a second image data reading unit that reads second image data which is image data of a second surface of the original document;
   a first transfer unit that transfers the image data, the image data being read by the image reading unit and being input to the first transfer unit;
   a transfer control unit that controls the first transfer unit to transfer the image data;
   an image forming unit that forms an image on a medium on the basis of the image data transferred by the first transfer unit, wherein the transfer control unit controls the first transfer unit to transfer the image data corresponding to one line of the original document every time when a set time period passes, the set time period being shorter than a time length of the line period; and
   a second transfer unit that transfers the first image data read by the first image data reading unit and the second image data read by the second image data reading unit to the first transfer unit, respectively, wherein
   when the first image data is transferred, the second transfer unit transfers the first image data corresponding to one line of the original document to the first transfer unit every time when the time length of the line period passes, and
   when the second image data is transferred, the second transfer unit transfers the second image data continuously line by line to the first transfer unit.

2. The image forming apparatus according to claim 1, further comprising a line counter unit that counts the number of lines transferred by the first transfer unit, wherein
   the line counter unit detects that a page is switched when the count value reaches a first value.

3. An image forming apparatus comprising:
   an image reading unit that reads image data corresponding to one line of an original document with a line period;
   a first transfer unit that transfers the image data, the image data being read by the image reading unit and being input to the first transfer unit;
   a transfer control unit that controls the first transfer unit to transfer the image data;
   an image forming unit that forms an image on a medium on the basis of the image data transferred by the first transfer unit, the transfer control unit controls the first transfer unit to transfer the image data corresponding to one line of the original document every time when a set time period passes, the set time period being shorter than a time length of the line period;
   a storage unit that stores the image data transferred by the first transfer unit; a third transfer unit that reads and transfers line by line the image data stored in the storage unit; and
   a transferred pixel number detection unit that detects whether the number of pixels transferred by the first transfer unit reaches the number of pixels corresponding to one line of the original document,
   wherein the transfer control unit controls the first transfer unit to stop the transfer of the image data during the set time period, when the number of pixels transferred by the first transfer unit reaches the number of pixels corresponding to one line of the original document, and when the third transfer unit detects that the transfer of the image data corresponding to one line of the original document is completed.

4. The image forming apparatus according to claim 3, wherein the transferred pixel number detection unit detects whether the number of pixels transferred by the first transfer unit reaches the number of pixels corresponding to one line of the original document by using a clock count value, and the clock count value is variably set depending on a bit width of a pixel.

5. An image forming method comprising:
   reading image data corresponding to one line of an original document with a line period, the reading including,
      reading first image data which is image data of a first surface of the original document, and
      reading second image data which is image data of a second surface of the original document;
   transferring, by a first transfer unit, line by line the image data read at the reading, so that the image data corresponding to one line of the original document is transferred every time when a set time period passes, the set time period being shorter than a time length of the line period; and
   forming an image on a medium on the basis of the image data transferred at the transferring;
   transferring, by a second transfer unit, the first image data and the second image data such that when the first image data is transferred, the first image data corresponding to one line of the original document is transferred to the first transfer unit and when the second image data is transferred, the second image data is transferred continuously line by line to the first transfer unit.

* * * * *